United States Patent [19]

Fimoff et al.

[11] Patent Number: 5,745,528
[45] Date of Patent: Apr. 28, 1998

[54] VSB MODE SELECTION SYSTEM

[75] Inventors: Mark Fimoff, Hoffman Estates; Timothy G. Laud, Mundelein, both of Ill.

[73] Assignee: Zenith Electronics Corporation, Glenview, Ill.

[21] Appl. No.: 501,966

[22] Filed: Jul. 13, 1995

[51] Int. Cl.[6] .................. H03K 9/00; H04L 27/06; H04L 27/14; H04L 27/22

[52] U.S. Cl. .................. 375/316; 375/261; 375/278; 348/470

[58] Field of Search .................. 348/471, 472, 348/725, 726, 473, 474; 375/278, 270, 277, 261, 264, 286, 301, 321, 340, 346, 316; 371/2.1, 6, 67.1; 329/304–307; 370/99

[56] References Cited

U.S. PATENT DOCUMENTS

| | | | |
|---|---|---|---|
| 4,385,383 | 5/1983 | Karchevski | 371/5.1 |
| 5,351,245 | 9/1994 | Pregont et al. | 371/5.2 |
| 5,363,408 | 11/1994 | Paik et al. | 375/261 |
| 5,410,368 | 4/1995 | Krishnamurthy et al. | 348/726 |
| 5,452,009 | 9/1995 | Citta | 348/470 |
| 5,459,456 | 10/1995 | Hosack et al. | 371/5.1 |
| 5,506,636 | 4/1996 | Patel et al. | 375/261 X |
| 5,508,748 | 4/1996 | Krishnmurthy et al. | 375/270 |
| 5,513,185 | 4/1996 | Schmidt | 371/5.1 |

*Primary Examiner*—Stephen Chin
*Assistant Examiner*—Brian Webster

[57] ABSTRACT

A transmitted digital VSB signal comprises a sequence of M-level symbols, where the value of M is defined by a mode control signal which is periodically multiplexed with the transmitted signal. A receiver includes an up/down counter which is reset to a zero count in response to a channel change signal and a latch responsive to the zero count of the counter for storing the next received mode control signal whose accuracy has been verified. The counter is incremented or decremented in response to each subsequently received verified mode control signal which respectively matches or does not match the stored mode control signal. Acquisition of new mode control signals is thereby relatively immune to burst noise, is effected very rapidly after a channel change and less rapidly in the absence of a channel change.

18 Claims, 11 Drawing Sheets

| VSB MODE M | DATA SYMBOLS PER FRAME | BITS PER SYMBOL | DATA BYTES PER FRAME | RS BLOCKS PER FRAME | INTERLEAVE GROUPS PER FRAME (B=26) | INTERLEAVE GROUPS PER FRAME (B=52) |
|---|---|---|---|---|---|---|
| 24 | 258,336 | 4.5 | 145,314 | 702 | 5589 | – |
| 16 | 258,336 | 4 | 129,168 | 624 | 4968 | 2484 |
| 8 | 258,336 | 3 | 96,876 | 468 | 3726 | 1863 |
| 4 | 258,336 | 2 | 64,584 | 312 | 2484 | 1242 |
| 2 | 258,336 | 1 | 32,292 | 156 | 1242 | 621 |

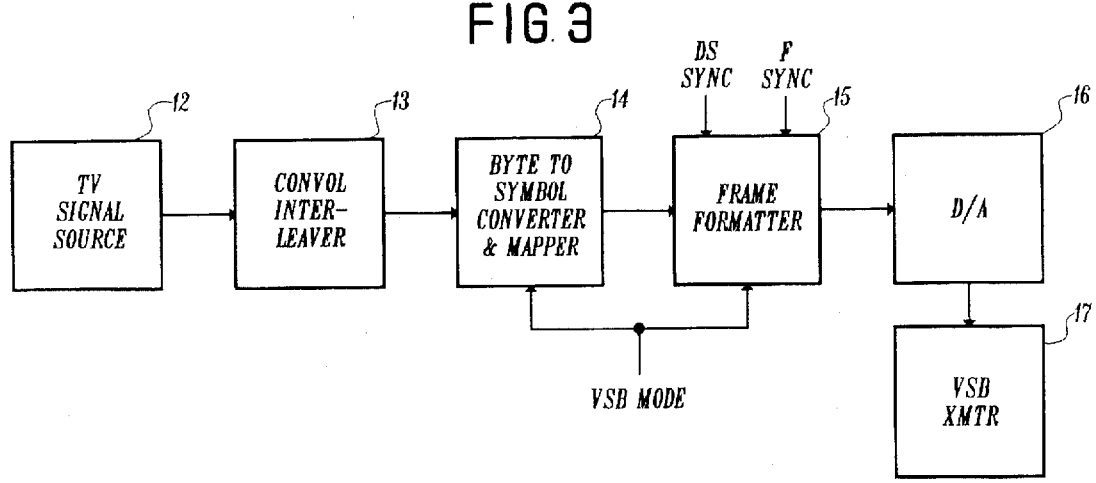
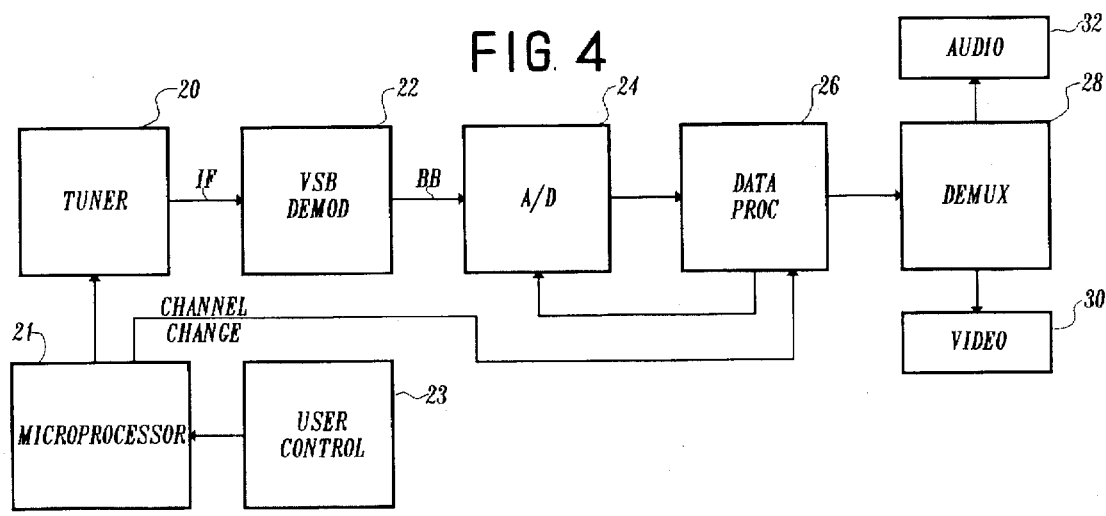
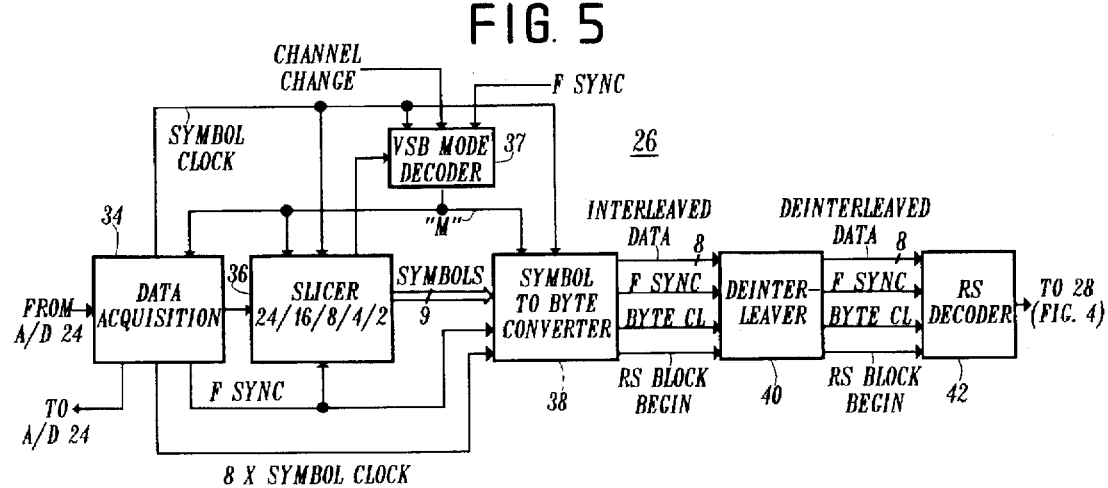

| VSB MODE M=16 | VSB MODE M=8 | VSB MODE M=4 | VSB MODE M=2 |
|---|---|---|---|
| -------- | -------- | -------- | -------- |
| 1111  +120 |  |  |  |
| -------- | 111  +112 |  |  |
| 1110  +104 |  |  |  |
| -------- | -------- | 11  +96 |  |
| 1101  +88 |  |  |  |
| -------- | 110  +80 |  |  |
| 1100  +72 |  |  |  |
| -------- | -------- | -------- | 1  +64 |
| 1011  +56 |  |  |  |
| -------- | 101  +48 |  |  |
| 1010  +40 |  |  |  |
| -------- | -------- | 10  +32 |  |
| 1001  +24 |  |  |  |
| -------- | 100  +16 |  |  |
| 1000  +8 |  |  |  |
| -------- | -------- | -------- | -------- |
| 0111  -8 |  |  |  |
| -------- | 011  -16 |  |  |
| 0110  -24 |  |  |  |
| -------- | -------- | 01  -32 |  |
| 0101  -40 |  |  |  |
| -------- | 010  -48 |  |  |
| 0100  -56 |  |  |  |
| -------- | -------- | -------- | 0  -64 |
| 0011  -72 |  |  |  |
| -------- | 001  -80 |  |  |
| 0010  -88 |  |  |  |
| -------- | -------- | 00  -96 |  |
| 0001  -104 |  |  |  |
| -------- | 000  -112 |  |  |
| 0000  -120 |  |  |  |
| -------- | -------- | -------- | -------- |

FIG. 3A

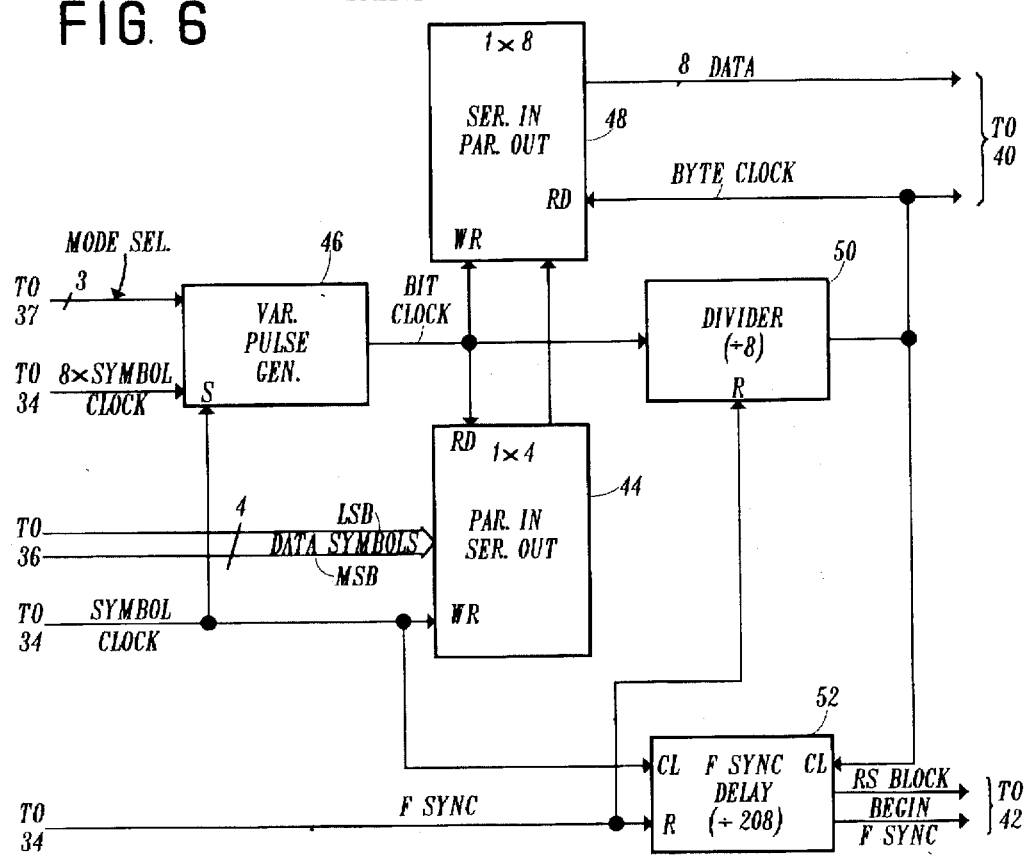

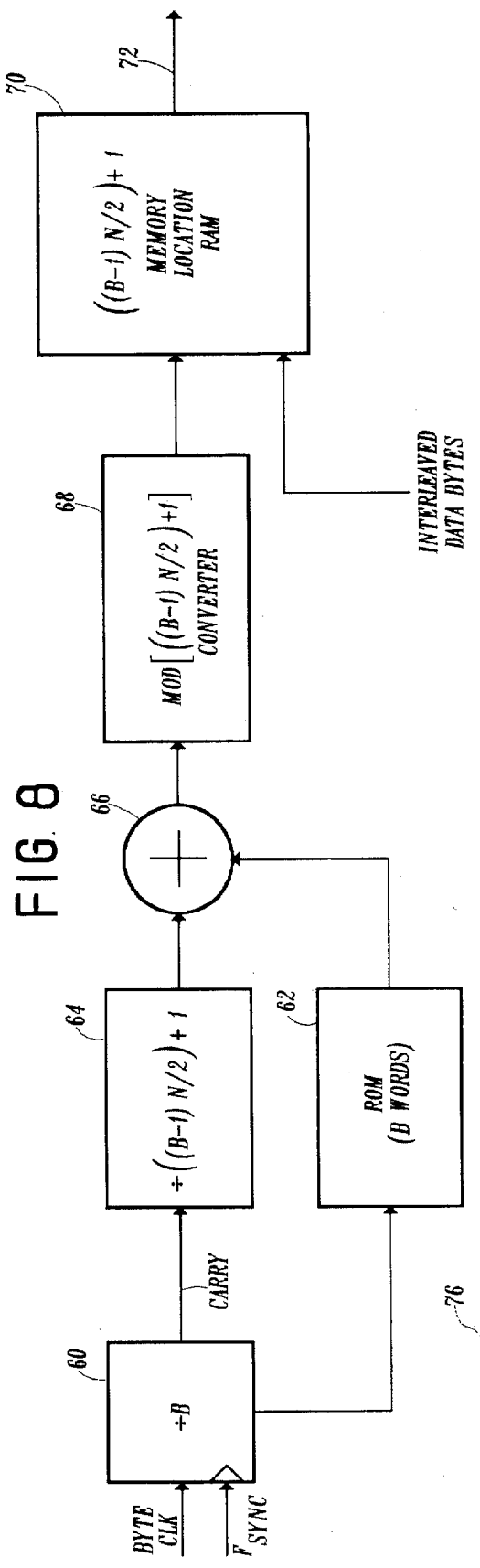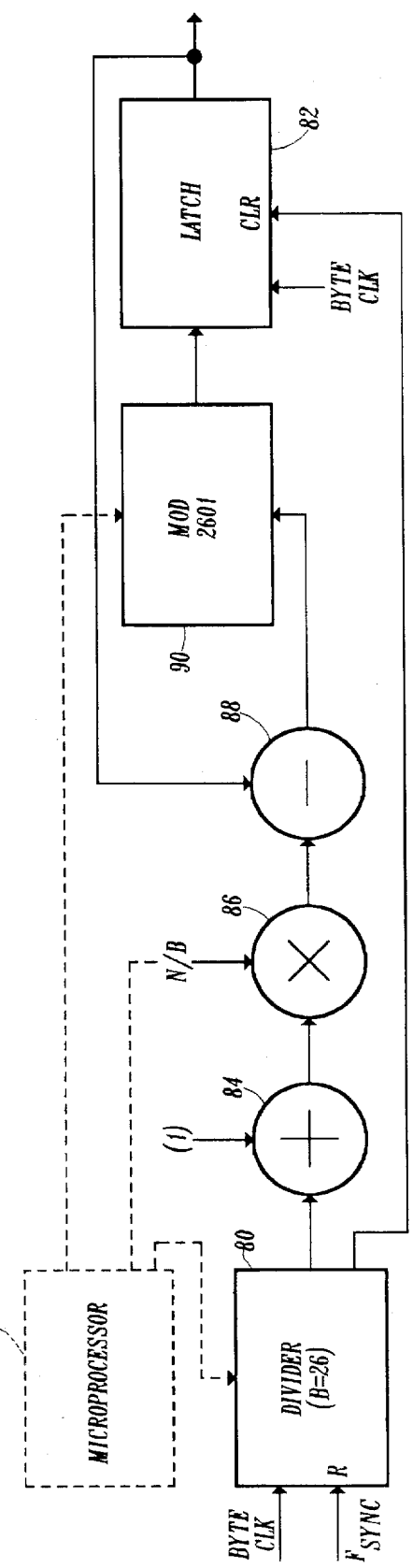

$B=52, N=208$

| 0 | 5101 | – | – | – | – | – | – | – | – | – | – | – | 1 |
|---|---|---|---|---|---|---|---|---|---|---|---|---|---|
| 1 | 5102 | – | – | – | – | – | – | – | – | – | – | – | 2 |
| 2 | 5103 | – | – | – | – | – | – | – | – | – | – | – | 3 |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | , |
| , | , | | | | | | | | | | | | 5304 |
| 5304 | , | | | | | | | | | | | | 0 |

| 12 | 1 | 5 | 11 |
|---|---|---|---|
| 11 | 0 | 4 | 10 |
| 10 | 12 | 3 | 9 |
| 9 | 11 | 2 | 8 |
| 8 | 10 | 1 | 7 |
| 7 | 9 | 0 | 6 |
| 6 | 8 | 12 | 5 |
| 5 | 7 | 11 | 4 |
| 4 | 6 | 10 | 3 |
| 3 | 5 | 9 | 2 |
| 2 | 4 | 8 | 1 |
| 1 | 3 | 7 | 0 |
| 0 | 2 | 6 | 12 |

VSB MODE SELECTION SYSTEM

CROSS REFERENCE TO RELATED APPLICATIONS

This application discloses subject matter claimed in copending application Ser. No. 175,014, U.S. Pat. No. 5,452,009 entitled DIGITAL TRANSMISSION SYSTEM WITH DATA RATE OPTIMIZED FOR NOISE IN TRANSMISSION MEDIUM; Ser. No. 175,085 abandoned entitled DATA SYSTEM HAVING 24 LEVEL SYMBOLS; Ser. No. 175,061 abandoned (which has been abandoned in favor of continuation-in-part application Ser. No. 417,581, U.S. Pat. No. 5,677,911 filed Apr. 6, 1995) entitled DATA FRAME FORMAT FOR VARIABLE SIZE DATA CONSTELLATIONS; Ser. No. 175,325 abandoned (which has been abandoned in favor of continuation-in-part application Ser. No. 315,153, filed Sep. 29, 1994 U.S. Pat. No. 5,572,532), entitled CONVOLUTIONAL INTERLEAVER AND DEINTERLEAVER; and Ser. No. 175,070, U.S. Pat. No. 5,631,645 entitled SYMBOL TO BYTE CONVERTER, all filed Dec. 29, 1993 and all assigned to Zenith Electronics Corporation.

BACKGROUND OF THE INVENTION AND PRIOR ART

This invention relates generally to digital transmission systems and particularly to a digital data transmission system in which data may be transmitted and received using any one of a plurality of different data constellations. The invention more specifically concerns a system for communicating information to a receiver regarding the particular data constellation being used at any given time in a respective channel.

U.S. Pat. No. 5,087,975 discloses a vestigial sideband (VSB) system for transmitting a television signal (or other data signal) in the form of successive M-level symbols over a standard 6 MHz television channel. The television signal may, for example, comprise one or two compressed wideband HDTV signals or a number of compressed NTSC signals. While the number of levels M characterizing the symbols may vary depending on circumstances, the symbol rate is preferably fixed, such as at a rate of 684 H (about 10.76 Megasymbols/sec), where H is the NTSC horizontal scanning frequency. The number of symbol levels used in any particular situation (hereinafter referred to as the VSB mode) is largely a function of the S/N ratio characterizing the transmission medium, a smaller number of symbol levels, i.e. a lower VSB mode, being used in situations where the S/N ratio is low. It is believed that the ability to accommodate symbol levels of 24, 16, 8, 4 and 2 provides adequate flexibility to satisfy conditions in most systems. It will be appreciated that lower values of M can provide improved S/N ratio performance at the expense of reduced transmission bit rate. For example, assuming a rate of 10.76M symbol/sec, a 2-level VSB signal (1 bit per symbol) provides a transmission bit rate of 10.76 Megabits/sec, a 4-level VSB signal (2 bits per symbol) provides a transmission bit rate of 21.52 Megabits/sec and so on up to a 24-level VSB signal which provides a transmission bit rate of about 48.43 Megabits/sec.

In a system of the foregoing type, each receiver must be informed of the VSB mode in use at any given point in time on the channel to which it is tuned. This is preferably accomplished by multiplexing a VSB mode control signal with the transmitted data which can be extracted by each receiver tuned to the respective channel, the VSB mode control signal identifying the number of levels M characterizing the symbols in use on the channel. In order to provide appropriate operating characteristics, it is desired that the receivers be capable of quickly acquiring the VSB mode control signal after a channel change and that the probability of the so-acquired signal being correct is very high. Also, the receivers must be capable of acquiring, although not necessarily as quickly, a new VSB mode control signal without an intervening channel change. At the same time, of course, a capability must be provided to replace an acquired incorrect mode control signal. Finally, once acquired, a correct mode control signal should be virtually immune to noise bursts and the like.

OBJECTS OF THE INVENTION

Accordingly, it is a basic object of the invention to provide a novel digital transmission system employing a plurality of different data constellations.

It is another object of the invention to provide a novel mode selection system for a multi-constellation digital transmission system.

It is yet a further object of the invention to provide a mode selection system for a multi-constellation digital transmission system in which a mode control signal defining the constellation in use on a tuned channel is rapidly acquired after channel change and is subsequently highly immune to noise bursts.

BRIEF DESCRIPTION OF THE DRAWINGS

These and other objects and advantages of the invention will be apparent upon reading the following description in conjunction with the drawings, in which:

FIG. 3 is a simplified block diagram of a transmitter in accordance with the invention;

FIG. 3A is a chart illustrating an implementation of the byte to symbol converter in the transmitter of FIG. 3;

FIG. 4 is a simplified diagram of a receiver constructed in accordance with the invention;

FIG. 5 is a more detailed showing of the data processor section of the receiver of FIG. 4;

FIG. 6 is a more detailed showing of the symbol to byte converter of the data processor of FIG. 5;

FIG. 7 is a diagram of an exemplary matrix of address signals for deinterleaving a convolutionally interleaved data stream according to the invention;

FIG. 8 is a generalized circuit operable for generating memory address signals according to the invention, including those illustrated in FIG. 7;

FIG. 9 is a deinterleave address signal matrix suitable for use in an actual embodiment of the invention;

FIG. 10 is another deinterleave address signal matrix suitable for use in an embodiment of the invention;

FIG. 12 is a replacement circuit for for the ROM of FIG. 8 or the RAM of FIG. 11;

FIGS. 14, 15 and 16 are diagrams of respective convolutional interleave address signal matrices suitable for use in accordance with the invention.

DESCRIPTION OF THE PREFERRED EMBODIMENT

Figures 1, 2:
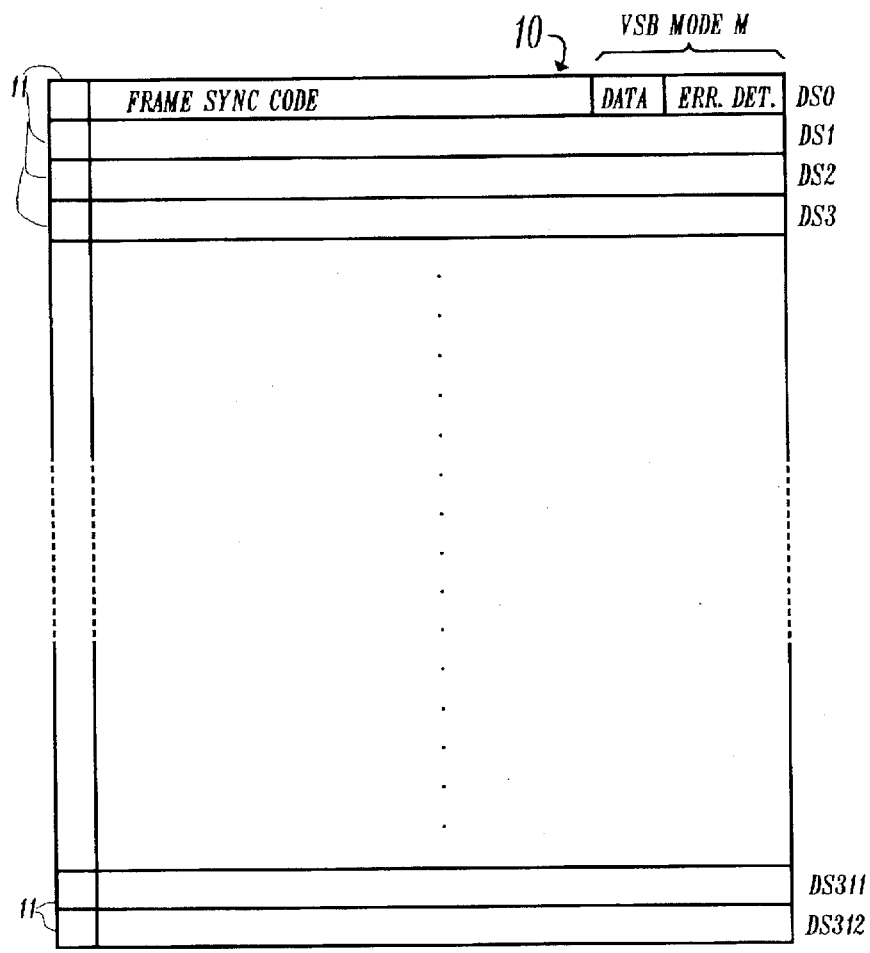
FIG. 1 illustrates an exemplary data frame structure useful with the invention.
FIG. 2 is a chart showing the relationship of data constellation size to the other parameters of the invention.

The structure of an exemplary data frame useful with the invention is illustrated in FIG. 1. The data frame, generally identified by reference numeral 10, comprises 313 data segments (DS) identified as DS0-DS312. Each data segment includes 828 symbols for data and 4 symbols defining a data segment sync character 11. Each data segment sync character 11 comprises four 2-level symbols which preferably assume the form disclosed in U.S. Pat. No. 5,416,524. The first data segment DS0 comprises only 2-level symbols. These 2-level symbols represent a pseudo random sequence frame synchronization code and an 8 symbol VSB mode control code that identifies the level M (e.g. 24, 16, 8, 4 or 2) of the symbols of the data fields of the remaining 312 data segments of the data frame. The VSB mode control code will be described in further detail hereinafter.

Referring to the table of FIG. 2, each data symbol of a data segment DS1-DS312 represents either 4.5 bits (M=24), 4 bits (M=16), 3 bits (M=8), 2 bits (M=4), or 1 bit (M=2). Since there are a fixed number of data symbols per frame (312×828=258,336), the number of data bytes per frame will vary as shown. That is, each frame comprises 145,314 data bytes for VSB mode M=24; 129,168 data bytes for VSB mode M=16; 96,876 data bytes for VSB mode M=8; 64,584 data bytes for VSB mode M=4; and 32,292 data bytes for VSB mode M=2. However, while the number of data bytes per frame varies depending on the VSB mode M, it will be observed that for any particular value of M (24, 16, 8, 4 or 2), an integral number of bytes is provided in each frame. This characteristic of the structure of frame 10 substantially simplifies the design of a receiver such that frame synchronization will be effected at a rate corresponding to an integral number of data bytes regardless of the VSB mode (i.e. 24, 16, 8, 4 or 2 level symbols). As will be explained in further detail hereinafter, the receiver forward error correction circuitry, the receiver symbol to byte converter, and the receiver deinterleaver are preferably frame synchronized with the transmitted signal. The frame sync signal can be directly used for these purposes so long as there are an integral number of bytes, forward error correction blocks and interleave groups in each data frame for each of the VSB modes.

Reed-Solomon (RS) forward error correction is used in the receiver of the invention. A transport packet size of 187 bytes is employed. Adding 20 parity bytes to each such transport packet results in an RS block size of 207 data bytes, allowing for the correction of 10 byte errors per RS block. As seen in FIG. 2, an RS block size of 207 bytes advantageously results in an integral number of RS blocks per frame for all of the selected VSB modes, thereby allowing the receiver RS decoder to be synchronized by the frame sync signal. A convolutional interleave group size (B) is defined according to the invention as comprising 26 or 52 data bytes (other values may be used) which also results in an integral number of interleave groups per frame regardless of the selected VSB mode (except for M=24 and B=52) as shown in FIG. 2. This also allows the frame sync signal to be used to periodically synchronize the receiver deinterleaver, thereby simplifying its design.

FIG. 3 is a simplified block diagram of a transmitter constructed in accordance with the invention. A source 12 of television signals is coupled to a convolutional interleaver 13 which, in turn, supplies interleaved data bytes to a byte to symbol converter and mapper 14. Unit 14 converts the input data to output symbols which are preferably RS forward error correction encoded. It will be appreciated that signal source 12 may comprise a compressed HDTV signal (or two compressed HDTV signals depending on the VSB mode) or a number of compressed NTSC signals. The symbol output of converter and mapper 14 is supplied to a frame formatter 15 that has inputs of data, data segment sync and frame sync and is controlled, along with converter 14, by a VSB mode control signal, which is also multiplexed in the frame as shown in FIG. 1. The formatted frames are supplied to a digital to analog (D/A) converter 16 and thence to a VSB transmitter 17 for transmission over a 6 MHz television channel. The transmission medium may comprise a cable television plant or a terrestrial broadcast environment. In either case, one such transmitter is required for each transmitted 6 MHz channel.

FIG. 3A is a chart illustrating a method of implementing the byte to symbol converter. The chart comprises four columns, one for each of the VSB modes M=16, M=8, M=4 and M=2. Converter 14 is operative in response to the applied VSB mode control signal for using the identified column of the chart of FIG. 3A for converting the input data bytes to output data symbols. For example, for VSB mode M=16, the input data byte 11010101 would be converted to two successive data symbols having relative amplitudes of +88 and −40. For VSB mode M=8, the input data byte would be converted to three successive data symbols having relative amplitudes of +80, +48 and −16 (assuming the first bit of the next data byte is 1) or +80, +48 and −48 (assuming the first bit of the next data byte is 0). For VSB mode M=4, the data byte would be converted to four successive symbols having relative amplitudes of +96, −32, −32 and −32. Finally, for VSB mode M=2, eight output symbols would be provided at relative amplitudes +64, +64, −64, +64, −64, +64, −64 and +64. In the case of VSB mode M=24, converter and mapper 14 includes appropriate memory and look-up tables for mapping successive groups of 9 input data bits into two successive 24 level output symbols. In this way each symbol can be referred to as representing 4.5 bits (i.e. 9 bits/2 symbols).

In connection with the foregoing, it will be observed that the relative levels of the symbols of each VSB mode are evenly spaced and lie midway between the relative levels of selected symbols of all higher VSB modes. For example, relative level +112 of VSB mode M=8 lies midway between relative levels +120 and +104 of VSB mode M=16, relative level +96 of VSB mode M=4 lies midway between relative levels +112 and +80 of VSB mode M=8 and midway between relative levels +104 and +88 of VSB mode M=16, relative level +64 of VSB mode M=2 lies midway between relative levels +96 and +32 of VSB mode M=4, +80 and +48 of VSB mode M=8 and +72 and +56 of VSB mode M=16, and so on. Preferably the symbol levels are offset from the values shown by a predetermined amount (e.g. +20) prior to transmission to provide a small pilot for facilitating carrier acquisition in the receiver. Also, it will be observed that the data rate characterizing each VSB mode increases by one bit per symbol relative to the data rate of the immediately lower VSB mode while its S/N ratio performance is reduced by one-half.

FIG. 4 is a simplified block diagram of a receiver constructed according to the invention. The received RF television signal from the transmitter of FIG. 3 comprises an M-level VSB signal having the frame format of FIG. 1. The received signal is converted to an IF frequency by a tuner 20 and applied to a VSB demodulator 22. The channel to which tuner 20 is tuned is controlled by a microprocessor 21, which in turn is operated in response to a user control 23, such as an on-board keyboard or a remote control transmitter. Microprocessor 21 also generates a channel change signal whenever it is instructed to tune a different channel by user control 23. VSB demodulator 22 generates an analog baseband output signal comprising the M-level symbols at a rate of about 10.76 Megasymbols/sec. This analog signal is sampled by an analog to digital (A/D) converter 24 which converts the symbols to binary form and applies them to a data processor 26. Data processor 26, which also receives the channel change signal from microprocessor 21, provides a feedback signal for controlling A/D 24 to insure that the analog baseband signal is sampled at the appropriate symbol times (see U.S. Pat. No. 5,416,524). Data processor 26 applies the processed binary data, in the form of data bytes corresponding to the output of television source 12 in FIG. 3, to a demultiplexer 28, which distributes the received data to a video processor 30 and to an audio processor 32, each of which includes appropriate decompression circuitry.

Data processor 26 is shown in more detail in FIG. 5. The binary symbols from A/D 24 are applied to a data acquisition circuit 34 which performs a number of functions including generating the feedback signal for controlling A/D 24, generating a symbol clock signal, generating a frame sync (FSYNC) signal and generating an 8 times symbol clock signal. The symbol clock signal has a frequency of about 10.76 MHz for all VSB modes except VSB mode M=24, in which case, as will be explained, its frequency is reduced by one-half to about 5.38 MHz. The FSYNC used in the preferred embodiment is approximately 41 Hz. The frame synchronization code of data segment DS0 enables derivation of the FSYNC signal which coincides in time with the first data symbol of data segment DS1 of each data frame 10.

The binary symbols from A/D 24 (representing the amplitudes of the sampled analog signal from VSB demodulator 22) are applied by data acquisition circuit 34 to a multilevel slicer 36 which converts the received symbols to bits according to the chart of FIG. 3A. As in the case of the transmitter, for VSB mode M=24, slicer 36 includes appropriate memory and look-up tables for mapping each successively received pair of symbols into 9 bits of output data. Slicer 36 couples the sliced values of the VSB mode control byte (eight 2-level symbols) of data segment DS0 of each frame to a VSB mode decoder 37, which develops a 3-bit VSB mode select signal. This signal identifies the VSB mode (M=24, 16, 8, 4 or 2) of the received symbols for controlling data acquisition circuit 34, slicer 36 and a symbol to byte converter 38 during the remainder of the respective frame. Slicer 36, which includes a nine line output bus, is responsive to the VSB mode select signal for converting the binary signal, representing the symbol amplitudes, to their corresponding bit values. Thus, in the M=2 VSB mode, each binary symbol amplitude signal is converted to the corresponding 1-bit signal on one of the nine output lines, to the corresponding 2-bit signal on two of the output lines in the M=4 VSB mode, to the corresponding 3-bit signal on three of the output lines in the M=8 VSB mode and to the corresponding 4-bit signal on four of the output lines in the M=16 VSB mode. In the M=24 VSB mode, two successive symbols are converted to the corresponding 9-bit signal (on all nine output lines) at one-half the symbol clock rate.

The nine-line output of slicer 36, together with the 3-bit VSB mode select signal from decoder 37 and the timing signals from data acquisition circuit 34 are coupled to symbol to byte converter 38, which is claimed in copending application Ser. No. 175,070, above, the output of which supplies a deinterleaver 40 that, in turn, supplies an RS decoder 42. Symbol to byte converter 38 converts the input bits representing the received symbols into a series of 8-bit data bytes for each of the VSB modes. Deinterleaver 40 deinterleaves the convolutionally interleaved data bytes supplied by converter 38 and RS decoder 42 performs error correction on the deinterleaved data bytes.

The transmitted VSB mode control code preferably comprises eight two-level symbols of the form PABCPABC, which are converted to eight corresponding bits, referred to hereinafter as the VSB mode control byte, by slicer 36 for application to VSB mode decoder 37. The 3-bit sequence ABC is the VSB mode select signal which identifies the VSB mode of the received data symbols and P is an even parity bit. For example, the 4-bit sequence PABC may identify the VSB modes as follows:

| P A B C | VSB MODE |
|---------|----------|
| 0 0 0 0 | 2 VSB    |
| 1 0 0 1 | 4 VSB    |
| 1 0 1 0 | 8 VSB    |
| 0 0 1 1 | 16 VSB   |

The foregoing manner of encoding the VSB mode control byte allows for the detection of any error pattern consisting of 3 or fewer bit errors. Some 4 bit error patterns can also be detected, including the case where the mode control byte is equal to 00 or FF (hex). As will be explained hereinafter, if any such error pattern is detected, the received VSB mode control byte is discarded.

Figure 5A:
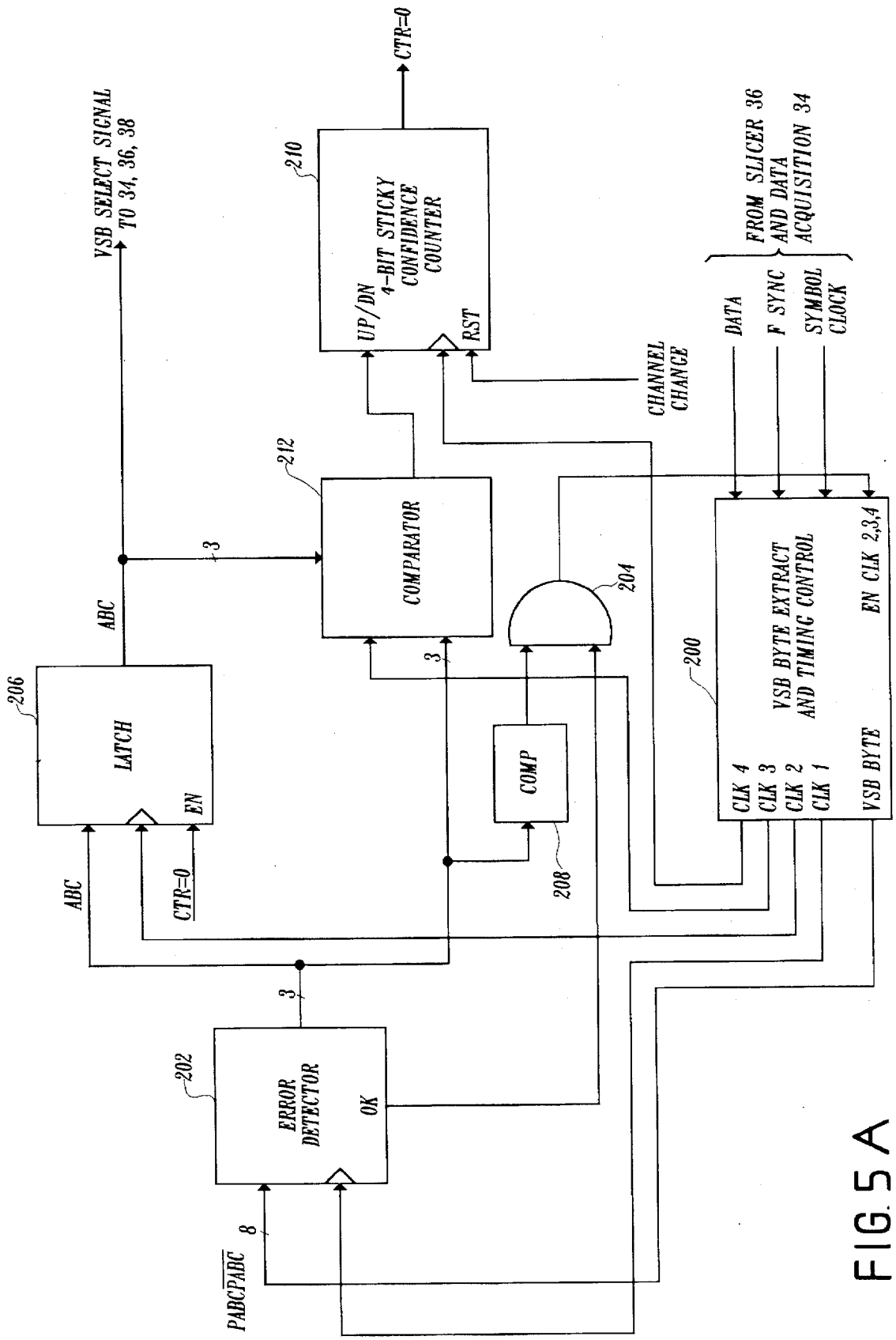
FIG. 5A is a more detailed showing of the VSB mode decoder of the data processor of FIG. 5.

A preferred embodiment of VSB mode decoder 37 is shown in FIG. 5A. The data signal from slicer 36 and the FSYNC and symbol clock signals from data acquisition circuit 34 are applied to respective inputs of a VSB byte extractor and timing control circuit 200, which is operable for extracting the VSB mode control byte PABCPABC from the received signal and for generating a sequence of clock signals CLK1–CLK4. The clock signals CLK1–CLK4 are preferably sequentially generated in response to FSYNC, with the generation of all four clock signals being completed before the end of the respective data frame. The extracted VSB mode control byte, together with a first clock signal CLK1, are applied to an error detector 202 which is capable of detecting any error pattern in the received mode control byte consisting of 3 or fewer bits and some 4-bit error patterns. If no errors are detected in the received mode control byte a high level signal is developed at the OK output of detector 202 and applied to one input of an AND gate 204. The 3-bit mode select signal ABC is coupled from another output of detector 202 to the input of a latch 206 and a comparator 208. Comparator 208 includes a memory storing all valid mode select signals and applies a high output to the second input of AND gate 204 when the received mode select signal matches one of the stored mode select signals. Thus, AND gate 204 provides a high output only if no errors are detected in the received mode control byte and the mode select signal embedded therein is valid.

The output of AND gate 204 is applied to an Enable input of unit 200 for enabling the sequential generation of clock signals CLK2, CLK3 and CLK4. It will be understood that these clock signals will only be generated if the received mode control byte, and the mode control signal embedded therein, satisfy the error detection and validity requirements explained above.

The CLK2 signal generated by unit 200 is applied for clocking the mode control signal ABC into latch 206. Latch 206 is further enabled for storing the applied mode control signal only when an up/down confidence counter 210 is characterized by a zero count. The mode control signal stored in latch 206 is applied from its output to one input of a comparator 212 and as the VSB select signal to data acquisition circuit 34, slicer 36 and symbol to byte converter 38. The mode control signal developed at the output of error detector 202 is applied to a second input of comparator 212, which is clocked by clock signal CLK3. The output of comparator 212 is applied to the up/down input of counter 210, which is clocked by clock signal CLK4 and reset to a zero count by a channel change signal from tuner 20.

In operation, the mode control signal ABC embedded in the first error free and valid VSB mode control byte PABC $\overline{PABC}$ received after a channel change (counter 210 reset to zero) is stored in latch 206. The mode control signal is thereby rapidly acquired following channel change for distribution throughout the receiver. Thereafter, each subsequently received mode control signal which satisfies the error detection and validity criteria of units 202 and 208 enable unit 200 for sequentially clocking comparator 212 and counter 210. If the received mode control signal matches the one stored in latch 206, confidence counter 210 is incremented. This process is continued until the counter achieves a maximum count of 15 where it will stick. If, on the other hand, a VSB mode control signal is received that satisfies the error detection and validity criteria but does not match the mode control signal stored in latch 206, counter 210 is decremented. Fifteen consecutive such non-matching mode control signals must be received to reset counter 210 to zero and thereby enable storage of a new mode control signal in latch 206 for distribution throughout the receiver. This effectively protects the circuit from responding to mode control signals corrupted by burst noise, while preserving the ability to change VSB modes within a reasonable time frame. In any event, VSB mode changes are effected almost immediately following a channel change as described above.

As another example, assume that the first mode control byte received after a channel change results in the generation of an OK signal by error detector 202, but that in fact the byte has been corrupted by four or more errors. This is a possible event on a relatively noisy transmission channel. If the erroneous mode control byte includes a VSB select signal which matches a valid VSB select signal thereby enabling the generation of clock signals CLK2–CLK4, the erroneous VSB select signal will be latched in latch 206 and counter 210 will be incremented to "1". If the mode control byte received during the next data frame is also corrupted but nevertheless passes the tests imposed by error detector 202 and comparator 208, confidence counter 210 will only be incremented to "2" if the VSB select signal embedded in received mode control byte matches the previous VSB select signal stored in latch 206. It will be appreciated that receiving a second mode control byte corrupted by random channel noise in such a way that it passes the tests of circuits 202 and 208 and includes a VSB select signal which matches the value of the first corrupted mode control byte stored in latch 206 is extremely unlikely. Rather, the second corrupted mode control byte will most likely not match the first one such that counter 210 will be decremented to a zero state. It will thus be understood that in such relatively noisy conditions confidence counter 210 will remain in a state at or near zero and as soon as signal reception improves will be able to quickly enable latch 206 for storing the correct VSB select signal.

It will also be recalled that the VSB mode control byte is not protected by forward error correction nor interleaving as is the transmitted data. For VSB mode M=2, the transmitted data is therefore more robust than the 2-level mode control byte, which is a very undesirable condition since the mode control byte must be correctly received and decoded before the received data can be properly interpreted. The circuit of FIG. 5A solves this problem by increasing the level of confidence of correctly receiving the mode control byte even in the presence of noise at a level which largely corrupts the 2-level data.

Figure 5B:
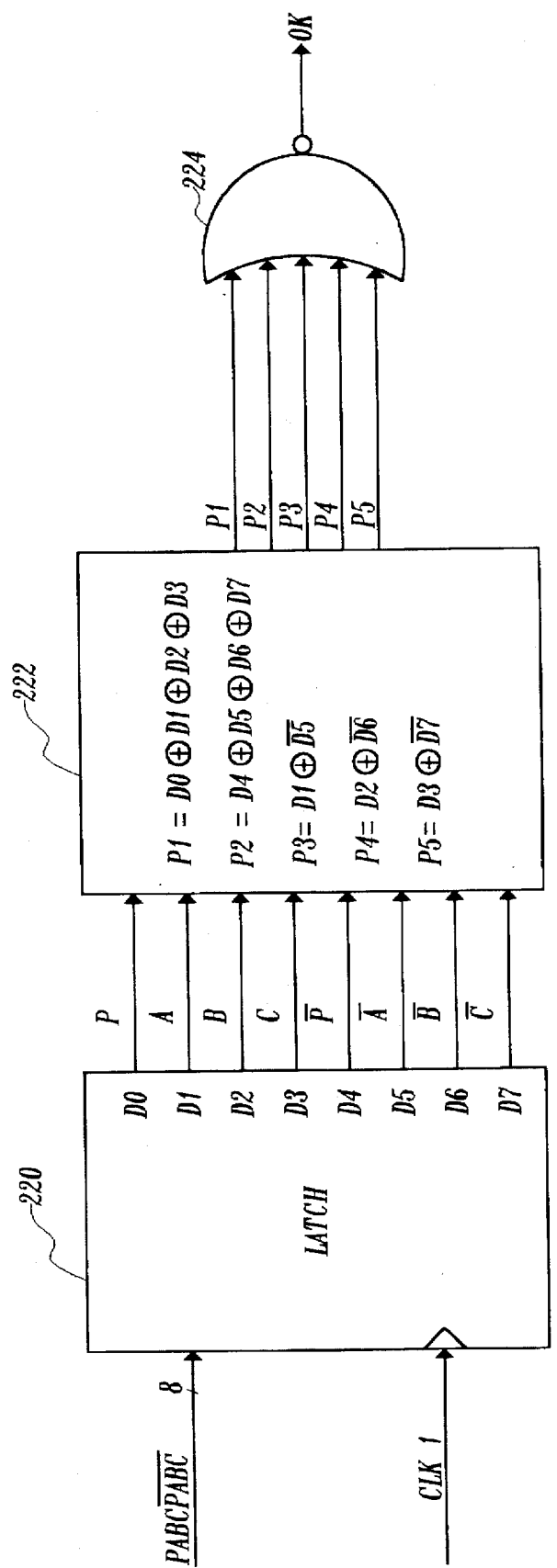
FIG. 5B is a more detailed showing of the error detector of the VSB mode decoder of FIG. 5A.

As described above, received mode control signals not satisfying both the error detection and validity criteria of units 202 and 208 are effectively discarded since they do not result in the enablement of unit 200 and the generation of clock signals CLK 2, 3 and 4. In this regard, an exemplary embodiment of error detector 202 is shown in FIG. 5B. In this circuit, the VSB mode control byte PABC$\overline{PABC}$ is clocked into a latch 220 in response to clock signal CLK1, the individual bits of which are provided at the latch outputs D0–D7 respectively. A syndrome calculation network 222 is responsive to the bits of the mode control byte developed at the output of latch 220 for performing the five illustrated calculations P1–P5. Calculations P1 and P2 each provide logical "0" results if PABC and $\overline{PABC}$ respectively are characterized by even parity and calculations P3, P4 and P5 each provide logical "0" results if A and $\overline{A}$, B and $\overline{B}$ and C and $\overline{C}$ respectively are each complementary relationships. P1–P5 are applied to the inputs of a NOR gate 224 such that a logic 1 signal is provided at the output of the gate (signal OK) when P1–P5 are all logic "0" and a logic 0 output is provided when any one or more of P1–P5 is logic "1". It will be appreciated that this allows for the detection of any error pattern consisting of 3 or few bit errors and some 4 bit error patterns including the cases where the mode control byte is equal to 00 or FF.

Symbol to byte converter 38 of FIG. 5 is shown in more detail in FIG. 6. The 9-line data symbol bus from slicer 36 and the symbol clock signal from data acquisition circuit 34 are applied to a 1×9 parallel-in, serial-out register 44. The 3-bit VSB mode control signal, the symbol clock signal and the 8 times symbol clock signal are applied to the inputs of a variable pulse generator 46. Generator 46 produces a series of pulses (bit clocks) at the 8 times symbol clock rate in response to each received symbol clock, the series including one pulse for VSB mode M=2, two pulses for VSB mode M=4, 3 pulses for VSB mode M=8, and 4 pulses for VSB mode M=16. A series of 9 pulses are sent for VSB mode M=24, while the symbol clock is halved.

Assuming, for example, VSB mode M=8, the 3 bits from slicer 36 (representing a received symbol) are simultaneously written into the top three locations of register 44 in response to a symbol clock. At the same time, the symbol clock starts pulse generator 46 which produces 3 bit clocks (at 8 times the symbol clock rate) which are applied to the Read (RD) input of register 44, to the Write (WR) input of a 1×8 Serial-in, Parallel-out register 48 and to the input of a divide-by-eight circuit divider 50. Divider 50 is reset at the beginning of each data frame 10 by FSYNC for synchronizing converter 38 with the received data, since FSYNC always represents a byte boundary. The 3 bits previously loaded into register 44 are serially read out of register 44 in response to the 3 bit clock pulses and written into register 48. The next 3-bit symbol from slicer 36 is processed in the same manner, resulting in 6 bits being stored in register 48. After the first two bits of the next (i.e. third) 3-bit symbol are written into register 48 from register 44, divider 50 generates an output (Byte Clock) causing the accumulated 8-bit data byte stored in register 48 to be read out (in parallel). The remaining single bit of the third symbol is stored in register 48 and read out with the next 7 bits of the succeeding 3-bit symbol as the next data byte. In this manner, converter 38 arranges the input 3-bit symbols (for M=8) into a series of successive 8-bit output data bytes, which are supplied to deinterleaver 40 at the rate of the byte clock.

A substantially similar procedure is carried out for VSB modes M=2, 4 and 16 except that, depending on the VSB mode, it will take a longer or shorter time period to compose the data bytes. For example, in VSB modes M=2 and 4, the bit clock generated by pulse generator 46 in response to each symbol clock signal comprises one and two pulses respectively, so that 8 and 4 symbol clock signals are required to produce the respective data bytes (versus 2⅔ for VSB mode M=8).

For VSB mode M=24, slicer 36 combines two 4.5 bit symbols into 9 bits at one-half the symbol clock rate and applies these signals to converter 38. Consequently, in response to each symbol clock, 9 bits from slicer 36 are loaded into register 44. Then, the 9 bits are serially read out of register 44 and written into register 48. However, after the 8th such bit has been written into the register, a Byte Clock output is generated by divider 50, reading these 8 bits out of register 48 as a data byte. The remaining bit will be read out of register 48 with the first 7 bits of the next symbol as the next data byte two symbol times later.

Converter 38 further includes a divider 52 which is also reset by FSYNC to synchronize its operation with the beginning of each data frame 10. In particular, divider 52 is a divide-by-207 counter which is clocked by the Byte Clock generated by divider 50 to generate a Begin RS Block signal for identifying the beginning of each block of 207 data bytes synchronously with the first data byte of each data frame. As will be explained hereinafter, this signal is used to synchronize the operation of RS decoder 42. Divider 52 includes means responsive to the symbol and byte clocks for converting the one-symbol-wide input FSYNC to a byte wide output FSYNC.

As described earlier, the outputs of converter 38 are applied to deinterleaver 40. As will be explained in further detail hereinafter, deinterleaver 40 deinterleaves the convolutionally interleaved data bytes received from converter 38 using a minimum of memory.

As is well known, interleaving is done at the transmitter (see interleaver 13 of FIG. 3) to spread contiguous data bytes apart from each other to help immunize the transmitted data from burst noise. In the receiver, the interleaved bytes must be deinterleaved to re-establish their original relationship prior to forward error correction. Thus, burst noise of some given time duration will corrupt only a limited number of bytes within an RS block of the deinterleaved data, which corrupted bytes can be corrected by the RS decoder. The interleaving algorithm used is selected in anticipation of the maximum expected burst noise duration at the fastest byte clock rate (i.e. corresponding to VSB mode M=24) to insure that the RS decoder is capable of error correcting the corrupted deinterleaved data bytes. Thus, as maximum expected burst noise duration increases, the interleaving algorithm must spread contiguous data bytes farther apart. Alternatively, a more powerful RS code may be used, but this approach has the disadvantage of using more overhead, i.e. requiring more bytes for error correction. Also, by referencing the system to the highest byte clock rate (corresponding to 24 VSB), increased burst error protection will be provided as the VSB mode and the corresponding byte rate decrease, because the interleave pattern is effected over a given number of bytes regardless of VSB mode.

Convolutional interleave algorithms are commonly used to immunize transmitted data from burst noise. Such algorithms delay the individual bytes of successive groups of bytes, sometimes referred to as the interleave depth, by different amounts to effectively scatter the bytes over a portion or all of the data frame. Deinterleaving is effected by delaying the received bytes by opposite amounts. In implementing such a system, three parameters are of particular significance; the maximum expected burst length BL, the number of byte errors T which the RS decoder can correct and the RS block size. As mentioned previously, there preferably are an integral number of RS blocks in the data frame so that the RS decoder can be synchronized by the frame sync signal FSYNC. By selecting an interleave group size (of which there are preferably an integral number in each frame) equal to a parameter B=BL/T and the different delays as integral multiples of a parameter N equal to or greater than the RS block size, the RS decoder will be able to correct the deinterleaved data for burst noise up to the maximum expected duration of BL byte clocks.

Consider the simplified example of a system in which the maximum expected burst length is 4 data byte clocks and the RS decoder is capable of correcting one data byte error in each 8 data byte RS block (i.e. BL=4, T=1, N=8). Using these parameters, the interleave group size B=BL/T=4/1=4. Convolutional interleaving is performed using these parameters such that for each group of B=4 data bytes, the first data byte is exposed to a delay of 0, the second to a delay of 1N=8 data byte clocks, the third to a delay of 2N=16 data byte clocks and the fourth to a delay of 3N=24 data byte clocks. Deinterleaving is effected by reversing the delays such that for each group of B=4 received interleaved data bytes, the first is delayed by 3N=24 data byte clocks, the second by 2N=16 data byte clocks, the third by 1N=8 data byte clocks and the fourth by 0.

Conventional convolutional deinterleavers implementing the above algorithm comprise a memory having (B−1)N/2 memory locations. For realistic values of B and N, which are typically much larger than the values used in the simplified example given above, this leads to a very complex architecture because of the large number of shift registers required. An alternate architecture which may be employed uses a standard linear memory array for which a large number of fifo head and tail pointers must be maintained in hardware. This is a very complex task and thus highly undesirable.

These problems are solved according to this invention by using a linear memory array with an address generator for generating a repeating sequence of read-write addresses that results in correctly deinterleaving the received data. The memory array is of a relatively small size utilizing only one memory location in excess of the number required to impose the different delays on the respective data bytes of each group. This invention is described below in relation to the simplified example given above and is extended to implementations using more realistic parameters.

More specifically, it has been discovered that a linear memory array having [(B−1)N/2]+1 memory locations may be addressed by a particular sequence of read-write addresses to correctly deinterleave a convolutionally interleaved data stream. The sequence of addresses is developed by first writing a column of [(B−1)N/2]+1 consecutive integers beginning with 0. This is represented by the first column of the addressing matrix of FIG. 7, which is for the simplified example with B=4 and N=8. Next a second column that is the same as the first is written except that it is rotated down by (B−1)N/B=(3×2)=6 rows. This is the second column in the matrix of FIG. 7. The third column is developed by rotating the second column down by (B−2)N/B=(2×2)=4 rows and, finally, the fourth and last column is developed by rotating the third column down by (B−3)N/B=(1×2)=2 rows. This matrix has a size of B=4 columns and [(B−1)N/2]+1=13 rows, the number of rows being the required size of the deinterleave linear memory array. If the numbers in the matrix are read out a row at a time, they can be used as read-write addresses for application to the deinterleave memory to continuously deinterleave the received data, i.e. read out the old data at the addressed memory location and write in the new data at the same location.

A circuit for generating the address matrix of FIG. 7 is illustrated in FIG. 8. A divide by B up-counter 60, which is reset to zero by FSYNC, is responsive to the byte clock from converter 38 for applying a repeating sequence of counts from a minimum number to a maximum number, e.g. from 0 to (B−1), for addressing a B word ROM 62 at the byte clock rate. ROM 62 stores the B words comprising the first row of the address matrix. The carry output of divider 60 is used to clock a second divider 64 at the slower rate of byte clock/B, the division ratio of divider 64 being [(B−1l)N/2]+1. The outputs of divider 64 and ROM 62 are summed in an adder 66 and applied through a modulo [(B−1)N/2]+1 converter 68 for addressing a linear deinterleave memory array 70 having [(B−1)N/2]+1 memory locations. Converter 68 preferably comprises a circuit which either couples its input signal to its output or, if the input is greater than [(B−1)N/2]+1, subtracts this value from the input signal before coupling it to its output.

For the simplified example described above, i.e. B=4 and N=8, divider 60 (÷4) repetitively generates the output count sequence 0, 1, 2, 3 for addressing and reading the four words 0, 7, 3, 1 stored in ROM 62 at the byte clock rate. Divider 64 (÷13) repetitively generates the output sequence 0, 1, 2 . . . 12 at ¼ the byte clock rate. Consequently, for each group of 4 successive byte clocks, the four words 0, 7, 3, 1 read from ROM 62 are each added to the output of divider 64 in adder 66 to produce, after processing by modulo 13 converter 68, a row of the address matrix of FIG. 7. For example, the first row 0, 7, 3, 1 of the matrix is produced during the first four byte clocks wherein O (from divider 64) is added to the outputs 0, 7, 3, 1 of ROM 62. During the next 4 byte clocks the value 1 (from divider 64) is added to the words 0, 7, 3, 1 generated by ROM 62 to produce the second row 1, 8, 4, 2 of the address matrix and so on until finally the last row is generated by adding 12 to each of the 4 words 0, 7, 3, 1 to produce the last row 12, 6 (=19 modulo 13, 2 (=15 modulo 13), 0 (=0 modulo 13).

Each address signal generated at the output of modulo 13 converter 68 initiates a read-write operation of RAM 70. That is, each address first causes the data byte stored at the addressed memory location to be read out on bus 72 and then the new interleaved data byte to be written into the same memory location. By following the addressing scheme disclosed herein, the data bytes read from RAM 70 will be in the correct deinterleaved format. The fact that the input data bytes are correctly deinterleaved can be seen from a close examination of the matrix of FIG. 7. In particular, it will be recalled that convolutional interleaving is effected for each group of four data bytes by delaying the first data byte by 0, the second data byte by 8 byte clocks, the third data byte by 16 byte clocks and the fourth data byte by 24 byte clocks. Theoretically, deinterleaving is then effected by delaying the first received data byte by 24 byte clocks, the second received data byte by 16 byte clocks, the third received data byte by 8 byte clocks and the fourth received data byte by 0 byte clocks. Adding a one byte clock delay to each received data byte will not affect the deinterleaving process so that delays of 25, 17, 9, 1 data clocks are equivalent to using deinterleaving delays of 24, 16, 8, 0 data clocks. Referring to the matrix of FIG. 7, the first received data byte is written into memory location 0 of RAM 70 and read out 25 byte clocks later at column 2, row 7 (i.e. after a delay of 25 byte clocks), the second is written into memory location 7 and read out 17 byte clocks later at column 3, row 5, (i.e. after a delay of 17 byte clocks), the third is written into memory location 3 and read out 9 byte clocks later at column 4, row 3 (i.e. after a delay of 9 byte clocks) and the fourth is written into memory location 1 from which it is read out 1 byte clock later at column 1, row 2 (i.e. after a delay of 1 byte clock). It will be apparent from this analysis that the deinterleaving algorithm is correctly executed.

In an embodiment of the invention actually being constructed for use in a cable television system the following parameters were selected: BL=260 bytes, T=10 and N=208. Therefore, B=BL/T=26 bytes, which is integrally related to the frame size for all VSB modes. For this case divider 60 of the circuit of FIG. 8 is a divide-by-26 divider (periodically reset by FSYNC) which sequentially address the 26 words of ROM 62 comprising the first row of the address matrix (0, 2401, . . . 1) shown in FIG. 9. Divider 64 is a divide by 2601 divider and converter 68 is a modulo 2601 converter. Operation of this embodiment of the circuit is identical to that described for the simplified example.

Figure 10:
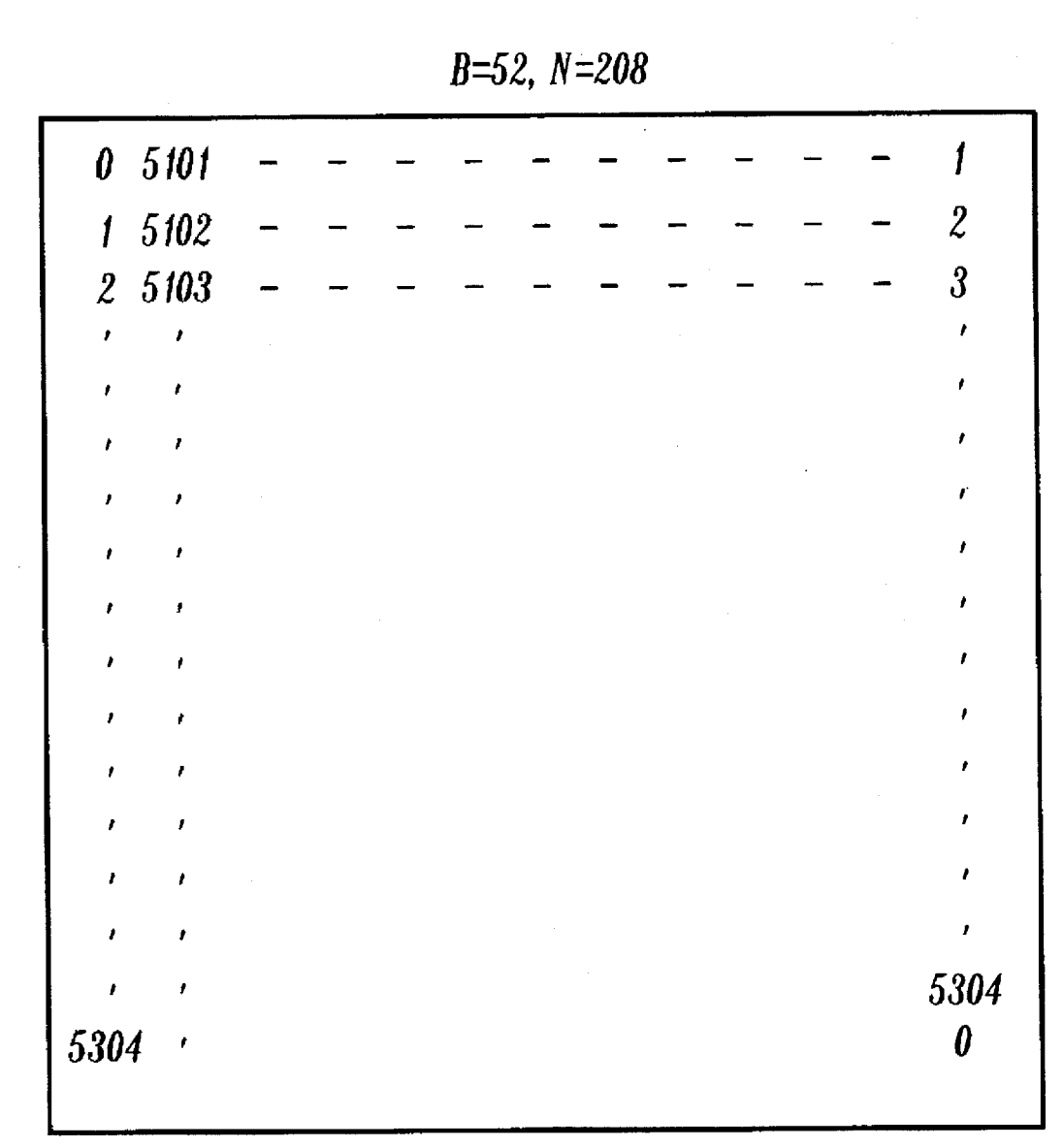

As previously mentioned, the system parameters may have values other than those given above. For example, in a terrestial application it may be desirable to increase the interleave depth B since a larger maximum burst noise length is to be expected. Thus, in a terrestial application the following parameters may be used: BL=520 bytes, T=10 and N=208. Therefore B=BL/T=52. The address matrix for these parameters (B=52 and N=208) is shown in FIG. 10. The circuit of FIG. 8 may also be used for generating the address matrix of FIG. 10 by substituting the appropriate values of B and N in the various circuit elements.

Figure 11:
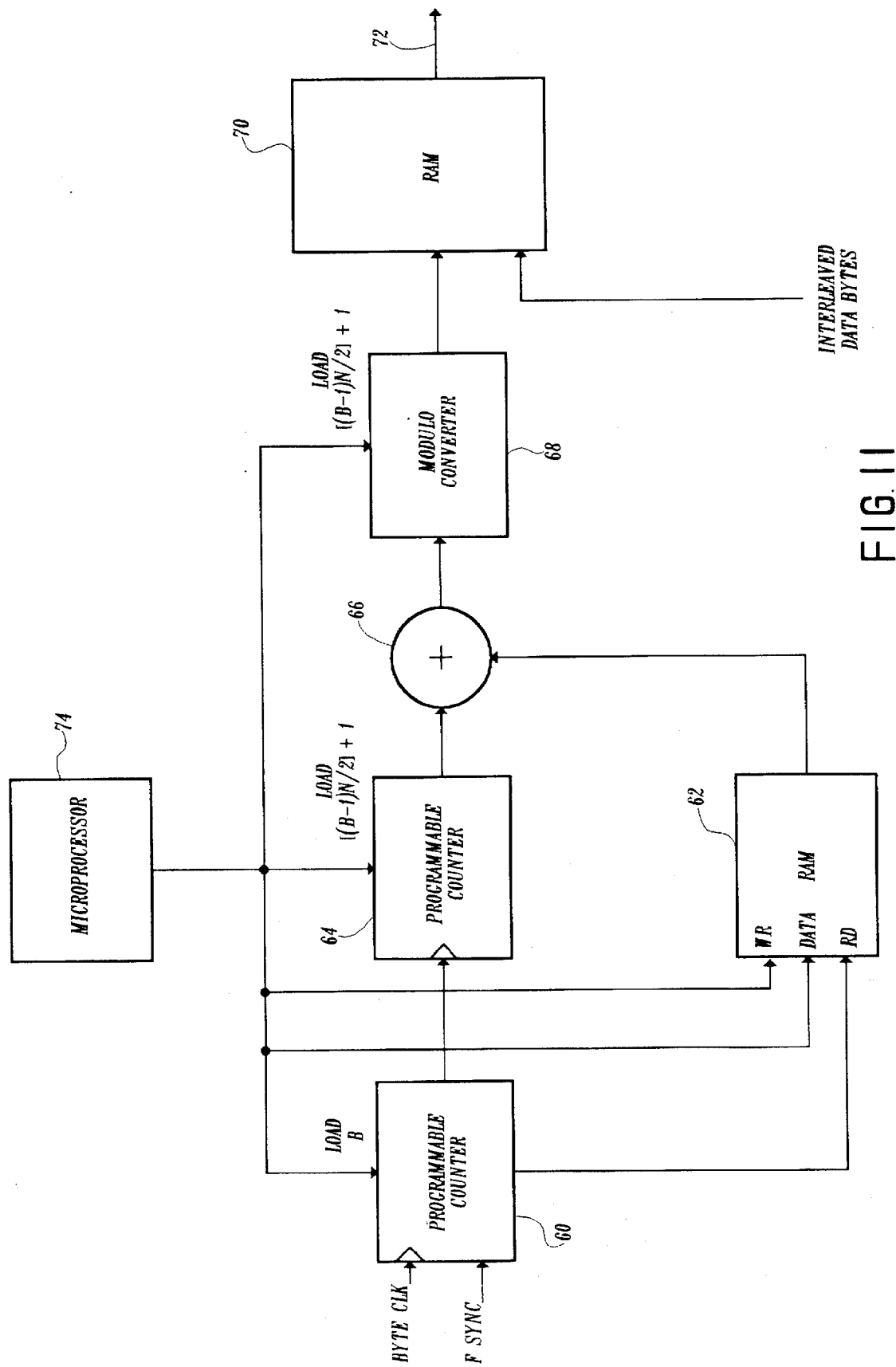
FIG. 11 is a programmable embodiment of the circuit of FIG. 8.

It may also be desirable to provide the circuit of FIG. 8 in a programmable form for selectively generating either the address matrix of FIG. 9 or the address matrix of FIG. 10. Such a circuit is shown in FIG. 11 wherein a microprocessor 74 is used at initialization to program counters 60 and 64 and modulo converter 68 with the appropriate values of B and N. Also, microprocessor 74 initializes memory 62 by loading the first row of addresses from either the matrix of FIG. 9 or FIG. 10. Thus, the circuit may be selectively operated in a first mode (B=26, N=208) by loading the value 26 into counter 60, the value 2601 into counter 64 and modulo converter 68 and by writing the first row of addresses form the matrix of FIG. 9 into memory 62. The circuit may be operated in a second mode to provide a larger interleave depth (B=52, N=208) by loading the value 52 into counter 60, the value 5305 into counter 64 and modulo converter 68 and by writing the first row of addresses from the matrix of FIG. 10 into memory 62. It will be understood that once programmed the circuit will operate as previously explained in connection with FIG. 8.

It will be noted that the circuits of FIGS. 8 and 11 automatically adapt to the different received VSB modes. The circuits simply operate at an increased or decreased rate in response to the byte clock as the VSB mode varies. The deinterleaved data on bus 72, together with the FSYNC and Begin RS Block signals from converter 38 are applied to RS decoder 42 which error corrects the deinterleaved data bytes. Operation of RS decoder 42 is facilitated by synchronization with FSYNC at the beginning of each data frame and by providing an integral number of RS blocks each frame regardless of the VSB mode as previously explained.

FIG. 12 shows a circuit which may be used in place of memory 62 of FIGS. 8 or 11 to generate the first row of matrix addresses. The circuit implements the following equations for generating the first row of addresses C (X):

$$C(0)=0$$

$$C(X)=[C(X-1)-(B-X)N/B]\mod[(B-1)N/2+1],$$

where X=1, . . . (B−1).

For the simplified example (i.e. B=4 and N=8) the term C(X) becomes C(X)=[C(X−1)−(4−X)2]mod 13. Thus, for example, if X=1, C(X)=(0−6)mod 13=−6 mod 13=7. Similarly, for X=2, C(X)=(7−4) mod 13=3. And finally, for X=3, C(X)=(3−2) mod 13=1. The first row for the larger matrices of FIGS. 9 and 10 may likewise be derived using these relationships. Referring to FIG. 12, the circuit comprises an input divide by B count down divider 80 which is reset by FSYNC and clocked by the byte clock. In response to being reset, an output of divider 80 clears a latch 82. The output of divider 80 is provided in reverse order (B−1, B−2, . . . 0) so that when it is incremented by one (1) in an adder 84, the result is (B−X). The variable (B−X) is multiplied by N/B in a multiplier 86 to provide the expression (B−X)N/B. Multiplier 86 may comprise a relatively simple bit-shifting circuit since, in both embodiments, the factor N/B is a power of two (i.e. 208/52=4 and 208/26=8). Expression (B−X) N/B is then subtracted from the output C(X−1) of latch 82 in subtractor 88 to provide C(X−1)−(B−X)N/B. Finally, the output of the subtractor is coupled by a modulo [(B−1)N/2]+1 circuit for temporary storage in latch 82 in response to a byte clock. As in the previous case, the circuit may be made programmable by providing a microprocessor 76 or other suitable controller for loading the appropriate divisor in divider 80, the value N/B into multiplier 86 and the value [(B−1)N/2]+1 into modulo converter 90 upon initialization.

Figure 13:
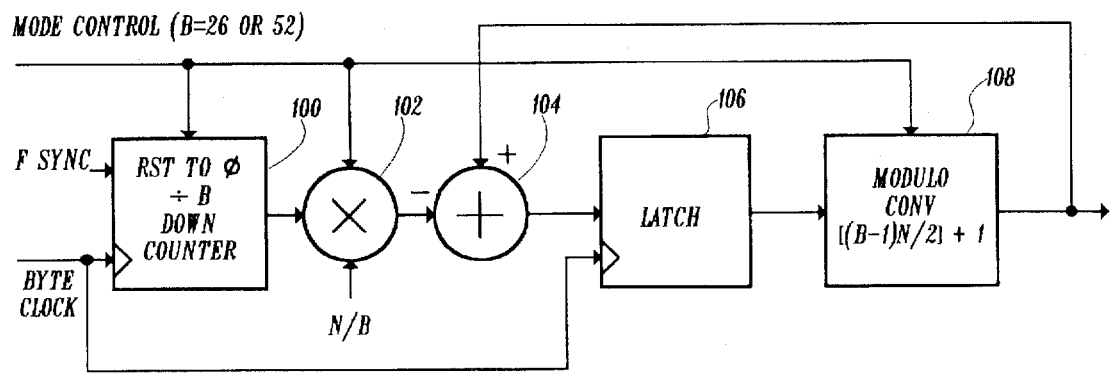
FIG. 13 is a block diagram showing an alternate embodiment of a convolutional deinterleaver according to the invention.

FIG. 13 illustrates an alternate embodiment of the deinterleaver circuits of FIGS. 8 and 11. In this embodiment a divide-by-B down-counter 100 is reset to zero by FSYNC and clocked by the byte clock. The output of counter 100 supplies one input of a multiplier 102, whose other input is supplied with the value N/B. As in the case of multiplier 86 of FIG. 12, multiplier 102 preferably comprises a bit-shifter since for both modes B=26 and B=52 the value N/B comprises a power of two. The output of multiplier 102 is applied to the negative input of a subtracting circuit 104, the output of which is applied by a latch 106 to the input of a modulo [(B−1)N/2]+1 converter 108. The output of converter 108, which represents the address signal sequences applied to memory 70 (see FIG. 8), is coupled back to the positive input of subtractor 104. As in the previous embodiments, a B=26 or B=52 mode control signal may be applied to counter 100, multiplier 102 and converter 108 for effecting operation in either of the respective modes.

Considering the simplified example of B=4, N=8, assume that counter 100 has just been reset to zero and that the current output of converter 108 is zero. Consequently, a value of zero will be developed at the outputs of both multiplier 102 and subtractor 104 and applied by latch 106 for development at the output of converter 108. The output of counter 100 next increments to a value of 3 so that the output of multiplier 102 goes to 6 and the output of subtractor 104 to −6. The value −6 is coupled by latch 106 to converter 108 where it is converted to the value 7. The output of counter 100 next increments to a value of 2 causing the output of converter 108 to assume the value of [7−(2×2)] modulo 13=3. The next byte clock causes the output of counter 100 to increment to a value of 1 and the output of converter 108 to assume the value [3−(2×1)] mod 13=1. Referring to FIG. 7, it will be seen that these four consecutive outputs comprise the first row of the address signal matrix. It will be understood that the subsequent rows of the address signal matrix are generated in a like manner and, when used to address the linear memory 70 as previously described, properly deinterleave the received convolutionally interleaved data bytes.

While the previous discussion has largely focused on the implementation of convolutional deinterleavers according to the invention, it will be understood that essentially the same techniques can be applied to the design and construction of convolutional interleavers. In particular, in order to provide a convolutional interleaver according to the invention it is only necessary to reverse the order of the address signal sequence represented by the matrices of FIGS. 7, 9 and 10 and to make some relatively minor circuit changes. The reversed order addressing matrix for the simplified case of B=4 and N=8 is shown in FIG. 14. The first column of the matrix is developed by writing a column of [(B−1)N/2]+1= 13 consecutive integers beginning with 12 and ending with 0. The second column comprises the first column rotated down by (B−3)N/B=(1×2)=2 rows, the third column comprises the second column rotated down by (B−2)N/B=2×2) =4 rows, and the fourth column comprises the third column rotated down by (B−1)N/B=(3×2)=6 rows. Similar interleave address signal matrices may be developed for the cases of B=26, N=208 and B=52, N=208, and these are shown in FIGS. 15 and 16 respectively.

The circuits of FIGS. 8 and 11 may be made to operate in an interleave mode by configuring counter 60 as a down-counter and by storing the last row of the respective address signal matrix of FIGS. 14, 15 or 16 in memory 62. With these changes, the output 72 of memory 70 will comprise the desired convolutionally interleaved data stream.

Figure 17:
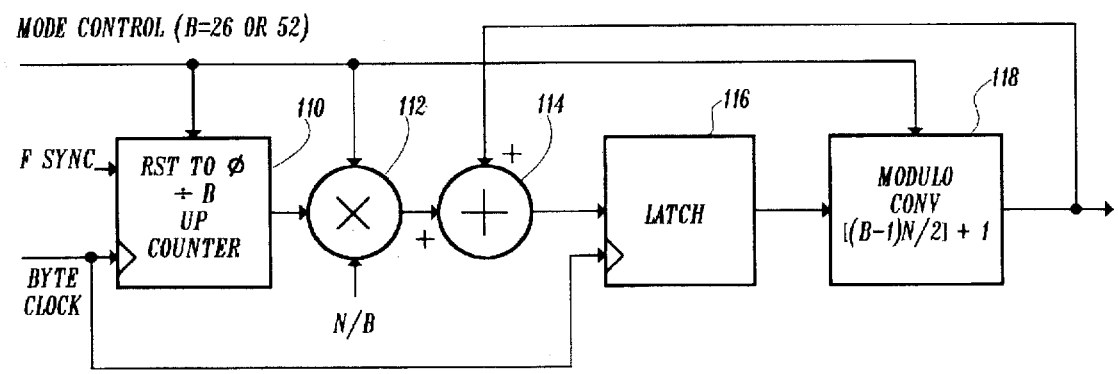
FIG. 17 is a block diagram showing an alternate embodiment of a convolutional interleaver according to the invention.

An alternate interleaver embodiment, similar to the deinterleaver embodiment of FIG. 13, is shown in FIG. 17. In this embodiment a divide-by-B up-counter 110 is reset to zero by FSYNC and clocked by the byte clock. The output of counter 110 supplies one input of a multiplier 112, whose other input is supplied with the value N/B. As in the previous embodiments, multiplier 112 preferably comprises a bit-shifter since for both modes B=26 and B=52 the value of N/B comprises a power of two (i.e. 208/26=8 and 208/52= 4). The output of multiplier 112 is applied to one input of an adder 114, the output of which is applied by a latch 116 to the input of a modulo [(B−1)N/2]+1 converter 118. The output of converter 118, which represents the address signal sequences applied to memory 70, is coupled back to the second input of adder 114. A B=26 or B=52 mode control signal may be applied to counter 110, multiplier 112 and converter 118 for effecting operation in either of the respective modes.

Considering again the simplified example of B=4, N=8, and assuming that the current output of converter 118 is 0, the address signal matrix of FIG. 14 is generated by the circuit of FIG. 17 as follows. Counter 110 will produce successive outputs of 0, 1, 2, 3, 0, 1, 2, 3 . . . in response to the byte clock. Multiplier 112 will therefore produce the corresponding outputs 0, 2, 4, 6, 0, 2, 4, 6 . . . The corresponding outputs of adder 114 and latch 116 are therefore 0(0+0), 2(2+0), 6(4+2), 12(6+6), 12(0+12), 14(2+12), 5(4+1), 11(6+5) . . . and the outputs of converter 118 are 0,2,6,12,12,1 (14 modulo 13), 5, 11 . . . It will be seen that the latter outputs comprise the last and first rows respectively of the address signal matrix of FIG. 14 and that the remaining rows will be generated in a like manner. The output of converter 118, when used to address a memory such as linear memory 70 will therefore properly interleave the data bytes prior to transmission.

The following claims are directed to the VSB mode selection system of the invention. It will be appreciated that the invention is limited only as defined in the claims.

The invention claimed is:

1. A method of operating a receiver in one of a plurality of modes each defined by a respective mode control signal comprising:
   providing a periodic succession of received mode control signals;
   setting a count to a predetermined value in response to a selected operation of said receiver;
   storing a current one of said received mode control signals in response to the value of said count being equal to said predetermined value;
   comparing said stored mode control signal with each subsequently received mode control signal and incrementally changing the value of said count in a first direction if said compared signals match and incrementally changing the value of said count in the opposite direction if said compared signals do not match; and
   operating a circuit in said receiver in response to said stored mode control signal for performing a predetermined function.

2. The method of claim 1 wherein said selected operation comprises changing the channel to which said receiver is tuned.

3. The method of claim 1 including discarding each received mode control signal that does not satisfy one or more predetermined error criteria.

4. The method of claim 3 wherein said discarding step comprises preventing the storage of each received mode control signal that does not satisfy said one or more predetermined error criteria.

5. The method of claim 4 wherein said one or more predetermined error criteria includes the number of bit errors characterizing each respective received one of said mode control signals.

6. The method of claim 4 wherein said one or more predetermined error criteria includes the validity of each respective received one of said mode control signals.

7. The method of claim 1 wherein said mode control signal comprises a mode control byte of the form PABCPABC, wherein the bits ABC define said plurality of modes and P is a parity bit.

8. The method of claim 1 wherein said mode control signals define a plurality of different data constellations.

9. The method of claim 1 wherein said predetermined value comprises a zero count and wherein said count is incrementally increased if said compared signals match and incrementally decreased if said compared signals do not match.

10. A method of operating a receiver for receiving a data signal transmitted according to one of a plurality of different data constellations, each of said data constellations defined by a periodically transmitted mode control signal, comprising:
    changing the channel to which said receiver is tuned;
    setting a count to a predetermined value in response to said channel changing step;
    verifying the accuracy of each of a succession of received ones of said mode control signals;
    storing a current one of said verified mode control signals in response to the value of said count being equal to said predetermined value;
    comparing said stored mode control signal with each subsequently verified mode control signal and incrementally changing the value of said count in an up or down direction if said compared signals match and incrementally changing the value of said count in the opposite of said up or down directions if said compared signals do not match; and
    recovering the data from said transmitted data signal in accordance with the data constellation defined by said stored mode control signal.

11. The method of claim 10 wherein said predetermined value comprises a zero count and wherein said count is incrementally increased if said compared signals match and incrementally decreased if said compared signals do not match.

12. A receiver for receiving a data signal transmitted according to one of a plurality of different data constellations, the constellation being used for transmission over any given channel being defined by a mode control signal periodically transmitted over the respective channel, comprising:
    a tuner for tuning a first channel over which said transmitted data signal is received;
    means generating a channel change signal for causing said tuner to tune a second channel over which said transmitted data signal is received;
    means for verifying the accuracy of the mode control signals received over said second channel;
    an up/down counter responsive to said channel change signal for assuming a predetermined count;
    a memory for storing the first verified one of said received mode control signals in response to said counter being characterized by said predetermined count;
    means comparing the mode control signal stored in said memory with each subsequently verified one of said received mode control signals for incrementing said counter if said compared signals match and decrementing said counter if said compared signal do not match; and
    means for recovering the data from the data signal transmitted over said second channel in accordance with the data constellation defined by said stored mode control signal.

13. The receiver of claim 12 wherein said predetermined count comprises a zero count.

14. The receiver of claim 12 wherein said verifying means comprises means for selectively generating respective clock signals for sequentially clocking said memory, said comparing means and said counter.

15. The receiver of claim 12 wherein said verifying means comprises means for detecting the presence of a predetermined number or fewer errors in each of said received mode control signals.

16. The receiver of claim 15 wherein said mode control signal comprises a mode control byte of the form PABCPABC, where the bits ABC define each of said plurality of data constellations and P is a parity bit.

17. The receiver of claim 12 wherein said verifying means comprises means for determining the validity of each received mode control signal.

18. The receiver of claim 17 wherein said validity determining means comprises means for comparing each received mode control signal with a plurality of stored valid mode control signals.

* * * * *